United States Patent [19]

Snider

[11] Patent Number: 5,791,695

[45] Date of Patent: Aug. 11, 1998

[54] FLEXIBLE JOINT FOR FACILITATING BENDING OF TUBULAR SEGMENTS

[75] Inventor: David A. Snider, Hurst, Tex.

[73] Assignee: Continental Emsco Co., Houston, Tex.

[21] Appl. No.: 424,724

[22] Filed: Apr. 18, 1995

[51] Int. Cl.$^6$ .................................................. F16L 25/00
[52] U.S. Cl. ........................................... 285/177; 223/231
[58] Field of Search ............................ 285/49, 223, 292, 285/231, 234, 263, 291, 284, 177

[56] References Cited

U.S. PATENT DOCUMENTS

| | | | |
|---|---|---|---|
| 1,793,888 | 2/1931 | Whitehouse | 285/231 X |
| 2,069,270 | 2/1937 | Piron | 267/63 |
| 2,349,016 | 5/1944 | Stephens | 285/223 |
| 3,189,372 | 6/1965 | Johnson | 285/231 X |
| 3,952,526 | 4/1976 | Watkins et al. | 61/46 |
| 3,958,840 | 5/1976 | Hickox et al. | 208/2 A |
| 3,998,503 | 12/1976 | Van Wyk | 308/36 R |
| 4,105,266 | 8/1978 | Finney | 308/237 |
| 4,121,861 | 10/1978 | Gorndt | 285/223 |
| 4,148,342 | 4/1979 | Welsby | 138/109 |
| 4,173,360 | 11/1979 | Bergman et al. | 285/51 |
| 4,236,737 | 12/1980 | Herbert et al. | 285/234 |
| 4,246,766 | 1/1981 | Gottschalk | 64/11 R |
| 4,324,194 | 4/1982 | Elliston | 114/264 |
| 4,470,621 | 9/1984 | Irvine | 285/114 |
| 4,489,962 | 12/1984 | Caumont et al. | 285/263 |
| 4,506,998 | 3/1985 | Showalter | 384/312 |
| 4,593,941 | 6/1986 | Whightsil, Sr. | 285/165 |
| 4,743,218 | 5/1988 | Aubrey et al. | 464/76 |
| 4,997,171 | 3/1991 | Toms, Jr. | 267/294 |
| 5,033,988 | 7/1991 | McGuire et al. | 464/69 |
| 5,133,578 | 7/1992 | Whightsil, Sr. | 285/166 |
| 5,299,790 | 4/1994 | Whightsil, Sr. | 267/292 |
| 5,366,324 | 11/1994 | Arlt et al. | 405/195.1 |
| 5,482,406 | 1/1996 | Arlt, III | 405/195.1 |

FOREIGN PATENT DOCUMENTS

| | | | |
|---|---|---|---|
| 861377 | 2/1941 | France | 285/231 |
| 975122 | 8/1961 | Germany . | |
| 2229983 | 1/1974 | Germany | 285/177 |
| 2935414 | 3/1981 | Germany | 285/49 |
| 2000253 | 1/1979 | United Kingdom | F16F 3/08 |
| 2074687 | 11/1981 | United Kingdom | 285/223 |

OTHER PUBLICATIONS

Pages from a publication by CRP Marine Limited of England disclosing subject matter on bending stiffeners and bending restrictors.

*Primary Examiner*—Dave W. Arola
*Attorney, Agent, or Firm*—Arnold, White & Durkee

[57] ABSTRACT

A flexible joint is provided for facilitating bending of tubular segments. The flexible joint includes an outer cylindrical housing and at least one inner tubular member disposed within the outer cylindrical housing. The outer cylindrical housing has a first end which has an inwardly projecting bevel-shaped portion. The inner tubular member has a first end which has an outwardly projecting bevel-shaped portion. An elastomeric pad is bonded between an inner surface of the outer cylindrical housing and an outer surface of the inner tubular member at their respective first ends. The elastomeric pad has a bevel-shaped section which is adjacent to the inwardly projecting bevel-shaped portion of the first end of the outer cylindrical housing and the outwardly projecting bevel-shaped portion of the first end of the inner tubular member. It retains the inner tubular member within the outer cylindrical housing and permits limited axial, angular, and rotational movement of the inner tubular member relative to the outer cylindrical housing. A plurality of outer cylindrical housing/inner tubular member pairs may be linked in series, arranged in a nested telescopic fashion, or a combination of these arrangements. Methods for constructing the various embodiments of the flexible joint are also provided.

16 Claims, 5 Drawing Sheets

FLEXIBLE JOINT FOR FACILITATING BENDING OF TUBULAR SEGMENTS

FIELD OF THE INVENTION

The present invention relates generally to a flexible joint for tubular segments which may conduct pressurized fluids and, in particular, to a flexible joint adapted to accommodate marine riser segment misalignment so as to minimize the bending stresses resulting from displacements of the riser and to a flexible joint adapted to accommodate the misalignment of thin control line bundles or umbilicals so that the umbilicals may withstand tensile forces at various angles without kinking.

BACKGROUND OF THE INVENTION

Marine risers conduct fluids at high pressures between production and drilling equipment on the ocean floor and a floating vessel or tension leg production platform on the ocean's surface. The weight and internal pressure of such risers subjects the risers to high axial loads. Also, as the floating vessel or platform shifts relative to the equipment on the ocean floor, it may cause large angular and translational misalignment in the riser producing high stresses. As operating depths of marine risers have increased, so has the need to accommodate correspondingly increasing axial loads and angular and/or translational misalignment with flexible joints. Currently, riser applications which combine high internal pressure and/or axial load with significant misalignment require equipment such as a flexible hose and/or spherical bearings to connect the riser segments. These components require high manufacturing tolerances and are expensive. Flexible tubular conductors have been previously developed for use in marine risers to accommodate the high axial loads and large angular and/or translational misalignments.

In one prior solution, a flexible support joint is installed between a marine riser and a buoyancy chamber, whereby the chamber is supported from, and flexible relative to, the riser. The flexible support joint utilizes an elastomeric material between concentric inner and outer metal conduit sections. The inner and outer conduit sections are oriented relative to one another in a concentric, telescopic relationship, and a cylindrical elastomeric member is bonded therebetween. The flexible support joint assembly relies on shear and tensile loading of the elastomeric material to accommodate bending. The support joint in this design is too flexible to be reliably used in applications where the riser is subjected to significant axial, angular and rotational loads.

In another prior solution, a flexible tubular connector is provided which includes a central flexible tubular portion formed of elastomeric material connected at each end to a rigid tubular portion. Disposed in the central elastomeric portion are inner and outer reinforcing members for containing the pressure differential across the central portion and for carrying the longitudinal compressive loads. A plurality of circumferentially spaced, longitudinally extending metal wires are disposed in the central portion between the inner and outer reinforcing members to enable flexing of the central portion, while carrying the tension load on the flexible conductor. This device accommodates axial (tensile) loads while providing limited flexibility to the riser. This device utilizes no constraining shells on either side of the elastomer and is primarily loaded in tension via the longitudinal wires rather than through internal and external shells. Angular excursions of the riser are accommodated by the bending of the elastomeric cylinder.

Another problem encountered by riser segments is that over a large free span there exists the possibility of damaging the riser or other flexible pipe structure (e.g., an umbilical) due to overbending. Typical locations at which this problem may occur could be wellhead and platform connections. Overbending problems may also manifest themselves at connections to rigid flow lines.

A solution to this latter problem is to fit the riser or other flexible pipe structure with a device known as a bend stiffener or bend restrictor. This device contains a number of interlocking half rings which are fastened together around the pipe. The restrictor does not hinder the movement of the pipe until a pre-determined minimum bend radius is reached, at which point the restrictor elements lock. Additional external bending loads are subsequently carried by the restrictor and not the riser or other flexible pipe.

Yet another problem encountered by flexible risers is rotation of the riser or pipe about a fixed location. This typically occurs with dynamic flexible risers secured to rigid structures such as emergency release connectors or fixed flanges mounted on a riser base. The presence of environmental loads causes the riser or pipe to rotate about this fixed location. The rotation in combination with large axial loads may cause damage to the pipe structure due to overbending.

A solution to this problem is to attach a specialized bend stiffener, known as an integral stiffener, to the pipe end fitting. This device has a conical external profile with a central hollow cylindrical section which allows it to be slid over the end of the pipe. The stiffener is fitted with an internal metallic structure which enables it to be rigidly secured to the end fitting. If the pipe rotates about its mean position, the presence of the integral stiffener prevents the structure from being bent below a minimum allowable radius.

These devices are typically complex, expensive, and sometimes unreliable. While prior solutions have been useful, a simpler, less costly, and more reliable tubular connection for marine risers is desirable.

The present invention is directed to overcoming, or at least reducing the effects of, one or more of the problems set forth above.

SUMMARY OF THE INVENTION

In accordance with one aspect of the present invention, there is provided a flexible joint adapted to facilitate bending of tubular segments. In one application, the flexible joint is adapted to accommodate marine riser segment misalignment so as to minimize the bending stresses resulting from displacements of the riser. In another application, the flexible joint is adapted to accommodate misalignment of umbilicals so that the umbilicals may withstand tensile forces at various angles without kinking.

The flexible joint includes an outer cylindrical housing having a first end which has an inwardly projecting bevel-shaped portion. The flexible joint also includes an inner tubular member having a first end which has an outwardly projecting bevel-shaped portion and which is disposed within the outer cylindrical housing. The riser segment can be disposed within the inner tubular member or it can be integrally formed with it.

The flexible joint further includes an elastomeric pad which is disposed between an inner surface of the outer cylindrical housing and an outer surface of the inner tubular member at their respective first ends. The elastomeric pad has a bevel-shaped portion adjacent to the inwardly projecting bevel-shaped portion of the first end of the outer cylindrical housing and the outwardly projecting bevel-shaped portion of the first end of the inner tubular member. It retains the inner tubular member within the outer cylindrical housing and permits limited axial, angular and rotational movement of the inner tubular member relative to the outer cylindrical housing. The elastomeric pad also serves to hermetically seal the inner tubular member to the outer cylindrical housing.

In accordance with another aspect of the present invention, the outer cylindrical housing has a second end which has an inwardly projecting bevel-shaped portion. In this aspect of the invention, a second inner tubular member is provided having a first end which has an outwardly projecting bevel-shaped portion and which is disposed within the outer cylindrical housing. A second elastomeric pad is also provided which is disposed between the inner surface of the outer cylindrical housing and an outer surface of the second inner tubular member at the second end of the outer cylindrical housing and the first end of the second inner tubular member. The second elastomeric pad has a bevel-shaped portion adjacent to the inwardly projecting bevel-shaped portion of the second end of the outer cylindrical housing and the outwardly projecting bevel-shaped portion of the first end of the second inner tubular member. It retains the second inner tubular member within the outer cylindrical housing and permits limited axial, angular and rotational movement of the second inner tubular member relative to the outer cylindrical housing.

In accordance with a further aspect of the present invention, the inner tubular member has a second end which has an outwardly projecting bevel-shaped portion. In this aspect of the invention, a second outer cylindrical housing is provided having a first end which has an inwardly projecting bevel-shaped portion. The second end of the inner tubular member is disposed within the second outer cylindrical housing. A second elastomeric pad is also provided which is disposed between an inner surface of the second outer cylindrical housing and the outer surface of the inner tubular member at the first end of the second outer cylindrical housing and the second end of the inner tubular member. The second elastomeric pad has a bevel-shaped portion adjacent to the inwardly projecting bevel-shaped portion of the first end of the second outer cylindrical housing and the outwardly projecting bevel-shaped portion of the second end of the inner tubular member. It retains the inner tubular member within the second outer cylindrical housing and permits limited axial, angular and rotational movement of the inner tubular member relative to the second outer cylindrical housing. Any number of linked pairs of outer cylindrical housings and inner tubular members may be used depending on the particular application.

In accordance with yet another aspect of the present invention, the inner tubular member has a second end which has an inwardly projecting bevel-shaped portion which is parallel to the outwardly projecting bevel-shaped portion of the first end of the inner tubular member. In this aspect of the present invention, a nested inner tubular member is also provided having a first end which has an outwardly projecting bevel-shaped portion and which is disposed within the inner tubular member. A second elastomeric pad is also provided which is disposed between an inner surface of the inner tubular member and an outer surface of the nested inner tubular member at the second end of the inner tubular member and at the first end of the nested inner tubular member. The second elastomeric pad has a bevel-shaped portion adjacent to the inwardly projecting bevel-shaped portion of the second end of the inner tubular member and the outwardly projecting bevel-shaped portion of the first end of the nested inner tubular member. It retains the nested inner tubular member within the inner tubular member and permits limited axial, angular and rotational movement of the nested inner tubular member relative to the inner tubular member. Any number of nested inner tubular members may be used depending on the particular application.

In accordance with still another aspect of the present invention, the nested inner tubular member has a second end which has an outwardly projecting bevel-shaped portion. In this aspect of the present invention, the nested inner tubular member is disposed within a second outer cylindrical housing having a first end which has an inwardly projecting bevel-shaped portion. A third elastomeric pad is also provided which is disposed between an inner surface of the second outer cylindrical housing and the outer surface of the nested inner tubular member at the first end of the second outer cylindrical housing and the second end of the nested inner tubular member. The third elastomeric pad has a bevel-shaped portion adjacent to the inwardly projecting bevel-shaped portion of the first end of the second outer cylindrical housing and the outwardly projecting bevel-shaped portion of the second end of the nested inner tubular member. It retains the nested inner tubular member within the second outer cylindrical housing and permits limited axial, angular and rotational movement of the nested inner tubular member relative to the second outer cylindrical housing.

In accordance with still another aspect of the present invention, a method of assembling a flexible joint adapted to facilitate bending of tubular segments is provided. The method includes the step of inserting an inner tubular member having a first end, a portion of which has an outwardly projecting bevel-shape, into an outer cylindrical housing half having a first end, a portion of which has an inwardly projecting bevel-shape, and a second end which is straight, so that the outwardly projecting bevel-shaped portion of the first end of the inner tubular member is aligned adjacent to the inwardly projecting bevel-shaped portion of the first end of the outer cylindrical housing half. Next, a viscous elastomeric material is injected between an inner surface of the outer cylindrical housing half and an outer surface of the inner tubular member at their respective first ends. Then, the elastomeric material is cured forming a hardened elastomeric pad between the inner tubular member and the outer cylindrical housing half which retains the inner tubular member within the outer cylindrical housing half and permits limited axial, angular and rotational movement of the inner tubular member relative to the outer cylindrical housing half.

In accordance with still another aspect of the present invention, a second inner tubular member is bonded to a second outer cylindrical housing half using the same method steps of inserting the second inner tubular member into the second outer cylindrical housing half, injecting elastomeric material between the second inner tubular member and the second outer cylindrical housing half and curing the elastomeric material. Next, the straight ends of the first and second cylindrical housing halves are welded end-to-end thereby forming a flexible joint having two opposing inner tubular members which are retained within an outer cylindrical housing.

In accordance with still another aspect of the present invention, a nested inner tubular member is inserted into the first inner tubular member. The nested inner tubular member has a first end which has an outwardly projecting bevel-shaped portion. The first inner tubular member has a second end which has an inwardly projecting bevel-shaped portion. The outwardly projecting bevel-shaped portion of the first end of the nested inner tubular member is aligned adjacent to the inwardly projecting bevel-shaped portion of the second end of the first inner tubular member. Next, a viscous elastomeric material is injected in between an inner surface of the first inner tubular member and an outer surface of the nested inner tubular member at the second end of the first inner tubular member and at the first end of the nested inner tubular member. Then, the elastomeric material is cured so that a hardened elastomeric pad is formed between the nested inner tubular member and the first inner tubular member which retains the nested inner tubular member within the first inner tubular member and permits limited axial, angular and rotational movement of the nested inner tubular member relative to the first inner tubular member.

In accordance with still another aspect of the present invention, a second end of the nested inner tubular member which has an outwardly projecting bevel-shaped portion is inserted into a second outer cylindrical housing half having a first end which has an inwardly projecting bevel-shaped portion, and a second end which is straight. The outwardly projecting bevel-shaped portion of the second end of the nested inner tubular member is aligned adjacent to the inwardly projecting bevel-shaped portion of the first end of the second outer cylindrical housing half. Next, a viscous elastomeric material is injected between an inner surface of the second outer cylindrical housing half and the outer surface of the nested inner tubular member at the first end of the second outer cylindrical housing half and the second end of the nested inner tubular member. Then, the elastomeric material is cured so that a hardened elastomeric pad is formed between the nested inner tubular member and the second outer cylindrical housing half which retains the second end of the nested inner tubular member within the second outer cylindrical housing half and permits limited axial, angular and rotational movement of the nested inner tubular member relative to the second outer cylindrical housing half.

BRIEF DESCRIPTION OF THE DRAWINGS

The foregoing and other advantages of the invention will become apparent upon reading the following detailed description and upon reference to the drawings in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modification, equivalents, and alternatives falling within the spirit and scope of the invention as defined by the appended claims.

DETAILED DESCRIPTION OF THE INVENTION

Figure 1:
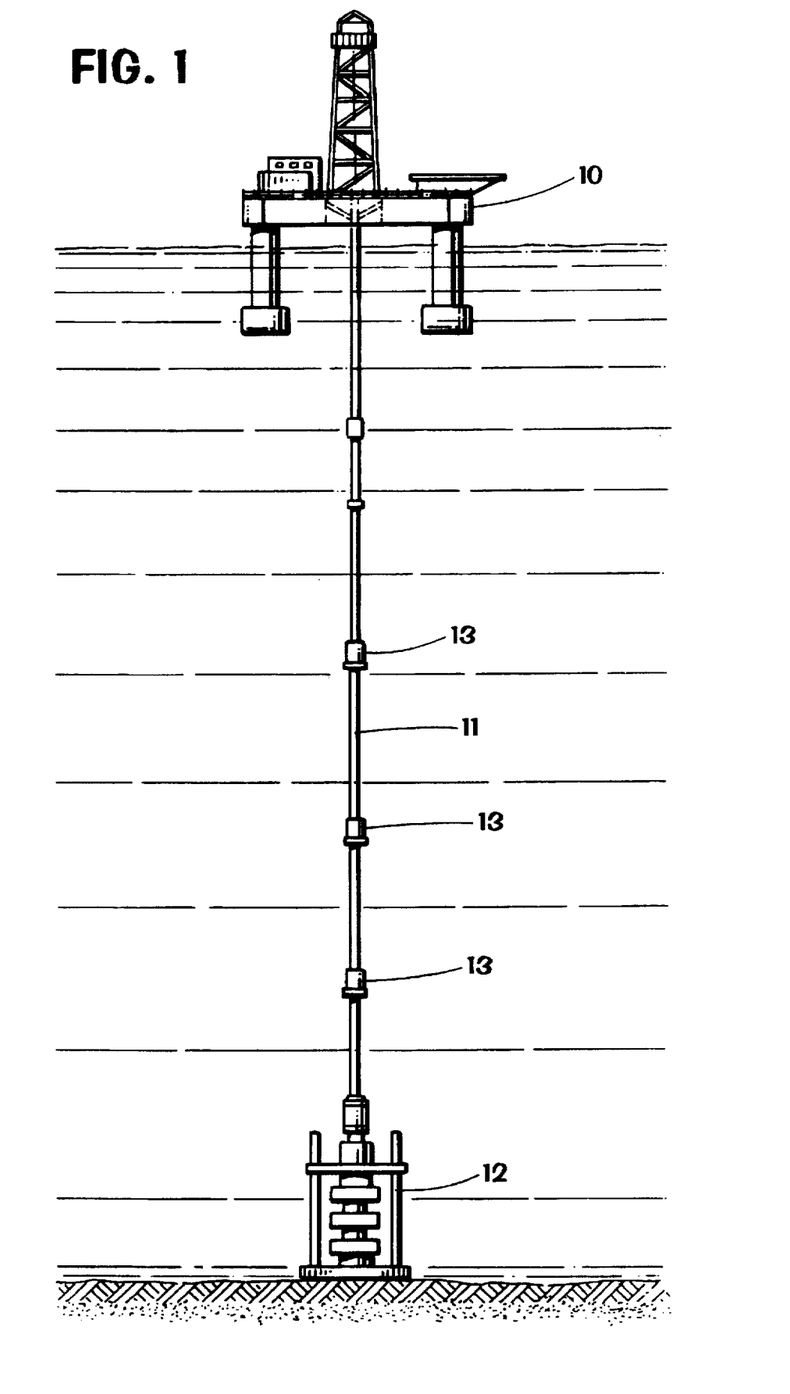
FIG. 1 is a front elevational view of an offshore drilling system that employs a riser and flexible joints.

Turning now to the drawings and referring initially to FIG. 1, an off-shore rig 10 and a riser assembly 11 extending between the ocean floor and the off-shore rig are shown. The riser assembly 11 is anchored to a base 12 on the ocean floor which extends about a wellbore or drill site. The riser assembly 11 is tubular in configuration and hermetically sealed so that items can be passed between the off-shore rig 10 and the wellbore without coming into contact with the ocean water. Further, the riser assembly 11 is constructed so as to prevent intermixing of fluids in the wellbore with the ocean water.

As known by those skilled in the art, off-shore rigs are often located in deep waters. In these applications, the riser assembly 11 extends a long distance between the rig 10 and the ocean floor. Accordingly, the riser assembly 11 is constructed from a plurality of tubular segments joined together to form a generally unitary tubular element. The joints between these tubular elements are hermetically sealed to prevent the intrusion of ocean water or the loss of fluids and hydrocarbons.

Furthermore, since the off-shore rig 10 floats on the surface of the water, movement of the off-shore rig 10 relative to ocean floor is to be expected. In fact, wave action and water currents can induce vertical, rotational, and translational movement of the rig 10 relative to the ocean floor. Accordingly, the riser segments forming the riser assembly 11 preferably accommodate axial, angular, and rotational movement. Typically, one or more joints, such as the illustrated joints 13, are employed in the riser assembly 11 to accomplish this purpose.

Figure 2:
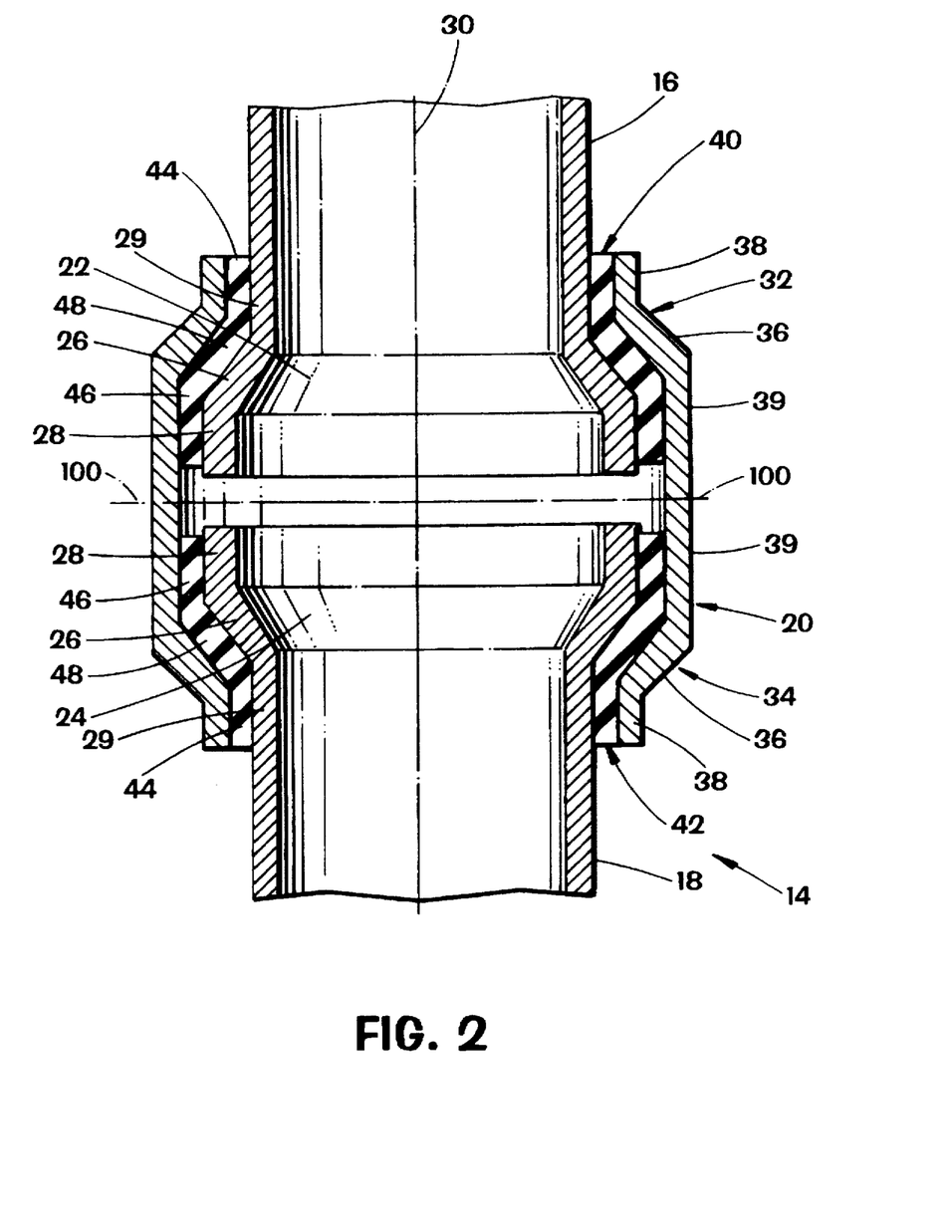
FIG. 2 is a lateral cross-sectional view of a flexible joint according to the present invention.

One embodiment of a flexible joint 14 according to the present invention is shown in FIG. 2. The flexible joint 14 includes two longitudinally opposed inner tubular members 16 and 18 disposed within an outer cylindrical housing 20. The inner tubular members 16 and 18 and the outer cylindrical housing 20 are preferably formed of a material compatible with the riser assembly 11. The inner tubular members 16 and 18 have ends 22 and 24, respectively, each of which has a bevel-shaped midsection 26, a straight outer section 28 and a straight inner section 29. The straight sections 28 and 29 are referred to as "dams." The straight sections 28 and 29 are parallel to the centerline 30. The bevel-shaped midsections 26 are oriented at an angle to the centerline 30.

The outer cylindrical housing 20 has opposite ends 32 and 34, each of which has a bevel-shaped midsection 36, an outer straight section 38, and an inner straight section 39. The straight sections 38 and 39 are parallel to the centerline 30, and the bevel-shaped midsections 36 are oriented at an angle to the centerline 30. The ends 22 and 24 of the inner tubular members 16 and 18 are disposed within the outer cylindrical housing 20 adjacent to the opposite ends 32 and 34, respectively.

Figure 3:
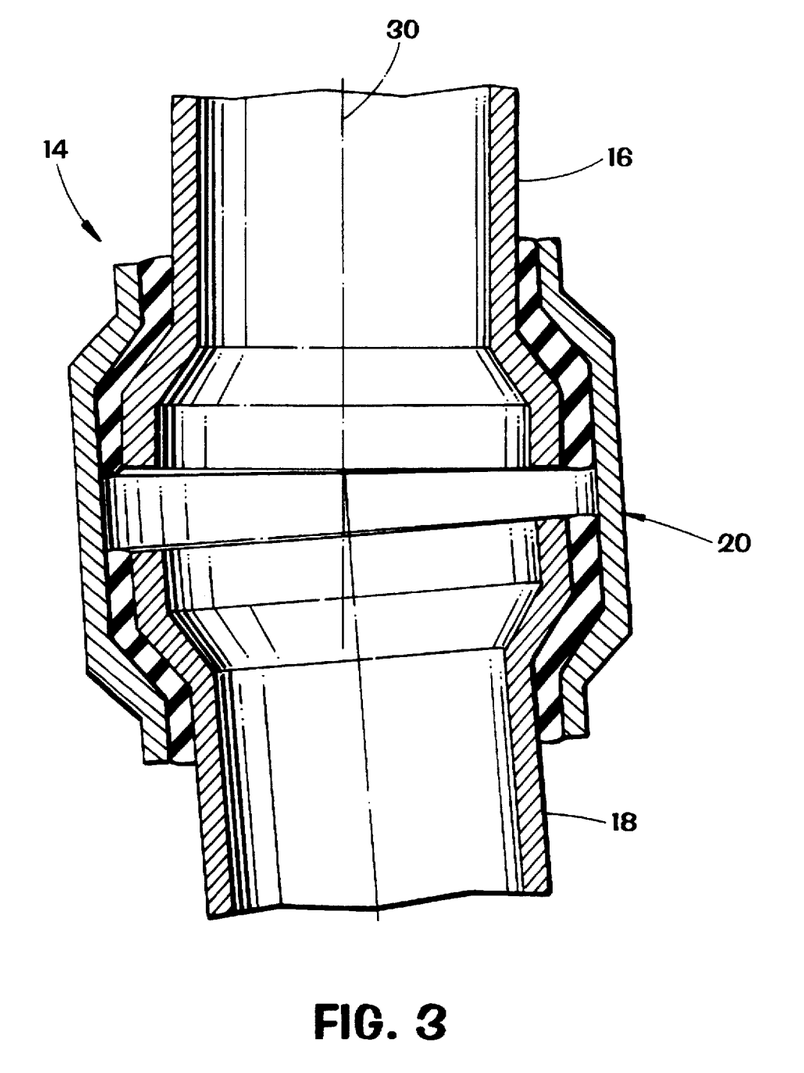
FIG. 3 is a lateral cross-sectional view of the flexible joint shown in FIG. 2 in a deflected condition.

A pair of annular-shaped elastomeric pads 40 and 42 are vulcanized to an inner surface of the outer cylindrical housing 20 and an outer surface of the inner tubular members at the opposite ends 32 and 34 of the outer cylindrical housing 20 and the ends 22 and 24 of the inner tubular members 16 and 18, respectively. The elastomeric pads 40 and 42 have straight ends 44 and 46 and a bevel-shaped midsection 48. The elastomeric pads 40 and 42 retain the inner tubular members 16 and 18 within the outer cylindrical housing 20 and permit limited axial, angular, and rotational movement of the inner tubular members relative to the outer cylindrical housing. FIG. 3 shows the inner tubular members 16 and 18 in a deflected position relative to the outer cylindrical housing 20.

The elastomeric pads 40 and 42 also serve to hermetically seal the inner tubular members 16 and 18 to the outer housing 20. The elastomeric pads 40 and 42 are preferably formed of a natural rubber or nitrile composition. Both materials have known fatigue characteristics, function well under loading conditions in cold temperatures, and are immune to the corrosive effects of hydrocarbons. In an alternate embodiment, the pair of elastomeric pads 40 and 42 may be replaced with a single uniform elastomeric pad.

The bevel-shaped midsections 48 act as a stiff compression member to withstand high axial loads which may result from either applied loads or pressure induced axial loads. By increasing the length of the bevel-shaped midsections 26, 36, and 48 and reducing its thickness, the flexible joint 14 can be made to accommodate extremely high axial loads. Short, thick bevel-shaped midsections 26, 36, and 48 can be very soft for both axial and rotational displacements.

The straight outer sections 44 add additional load capacity to the bevel-shaped midsections 48 by partially restricting the displacement of the elastomer and may be used to affect the rotational performance. The rotational stiffness can be increased by using longer straight sections at both sides of the bevel-shaped midsections 48. Conversely, if it is desired to make the flexible joint 14 somewhat flexible, no straight sections should be used on either side of the bevel-shaped midsections 48. For high internal pressure applications with large rotations, only the outer sections 44 should be used to support the bevel-shaped midsections 48 with less "pinching" of the straight sections during rotation.

Other factors that may be varied include independent dam and bevel thickness/length, inner and outer diameter (may continuously vary layer to layer), bevel angle, elastomer stiffness and elastomer non-linearity. The interaction of all of these variables allows the design to be fitted to a wide range of required loads and deflections. This embodiment is particularly well suited for accommodating marine riser segment misalignment so as to minimize the bending stresses resulting from displacements of the riser assembly 11.

The flexible joint 14 is constructed as follows. First, the inner tubular member 16 is inserted into an outer cylindrical housing half. An outer cylindrical housing half is half of the outer cylindrical housing 20 cut transversely along the centerline 100. After the inner tubular member 16 is inserted into an outer cylindrical housing half, a viscous elastomeric material is injected between the inner surface of the outer cylindrical housing half and the outer surface of the inner tubular member 16 using an injection or transfer molding process well known in the art. The elastomeric material is then allowed to cure until the hardened elastomeric pad 40 is formed.

Figure 4:
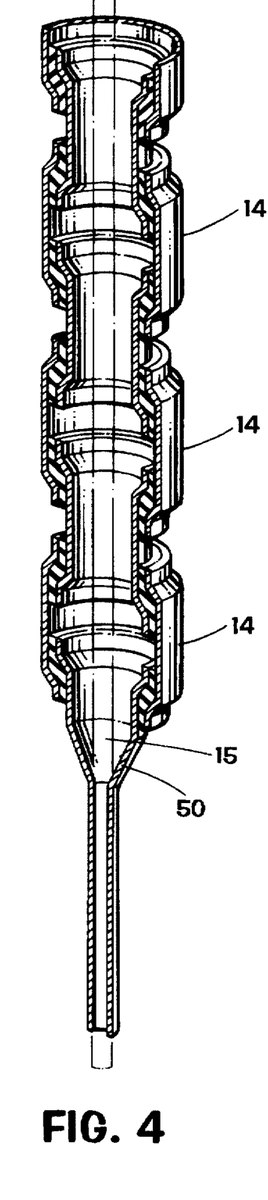
FIG. 4 is a cross-sectional view of another embodiment of the present invention wherein a plurality of flexible joints are linked in series.

To construct the flexible joints 14 shown in FIGS. 2–4, these steps are then repeated with the inner tubular member 18 and the other outer cylindrical housing half. Once the two half assemblies have been formed, the outer cylindrical housing halves are then welded together end-to-end to form one completed flexible joint 14, as shown in FIGS. 2–3. The other ends of the inner tubular members 16 and 18 are then bonded to other outer cylindrical housings using the same method to form the linked series embodiment shown in FIG. 4. Use of multiple flexible joints 14 in series allows greater rotational and longitudinal deflections to be accommodated.

In the embodiment shown in FIG. 4, the outermost inner tubular members terminate in a funnel-shaped section 50, known as a reducer, which is, in turn, connected to an umbilical 15 containing a bundle of control lines. The umbilical 15 is disposed within the reducer 50, but the umbilical 15 can also be integrally formed with the reducer 50.

Figure 5:
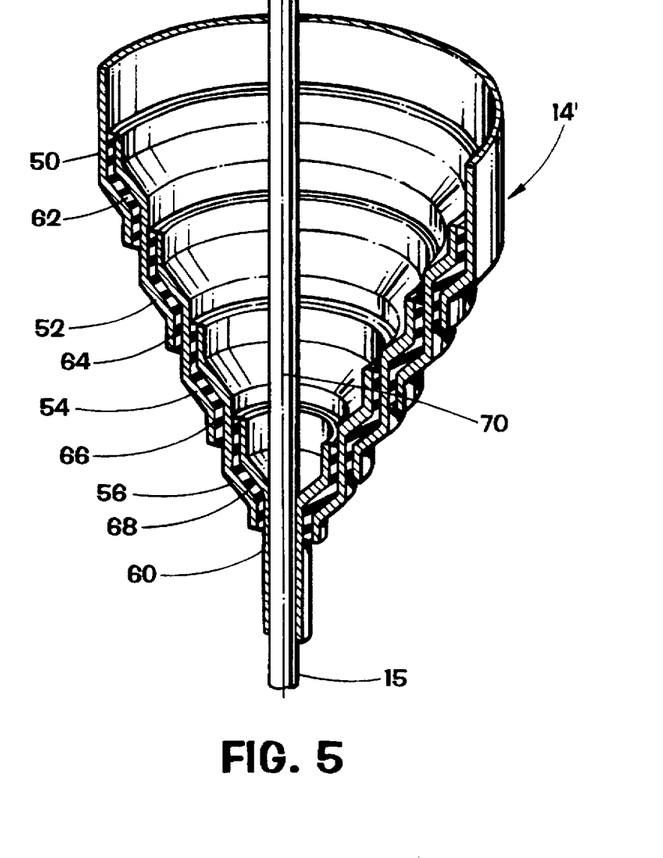
FIG. 5 is a cut-away perspective view of yet another embodiment of the present invention wherein a plurality of flexible joint shells are arranged in a nested and telescoping fashion.

In another alternative embodiment, the flexible joint 14' includes a plurality of nested shells 52, 54, 56 and 60 which are arranged in a concentric telescopic nested fashion, as shown in FIG. 5. The shells 52, 54, 56 and 60 are merely a plurality of nested outer cylindrical housings and inner tubular members, with the shell 60 being more specifically a reducer. A plurality of elastomeric pads 62, 64, 66, and 68 are bonded to the shells 52, 54, 56 and 60 in the regions where the shells overlap. The umbilical 15 is disposed within the nesting of the shells 52, 54, 56 and 60 along the longitudinal axis 70 of the shells. The flexible joint 14' limits bending stresses in the umbilical 15 under dynamic loading by controlling the curvature of the umbilical. The flexible joint 14' is preferably employed at either end, or both ends, of the umbilical to control bending stresses. This embodiment is particularly well suited for minimizing misalignment of the umbilical 15 so that the umbilical may withstand tensile forces at various angles without kinking.

The flexible joint 14– shown in FIG. 5 may be formed repeating the basic three-step method described above each time a new shell is added, or it may be formed by nesting all the shells at once and injecting the elastomeric material between all the shells in one step.

Figure 6:
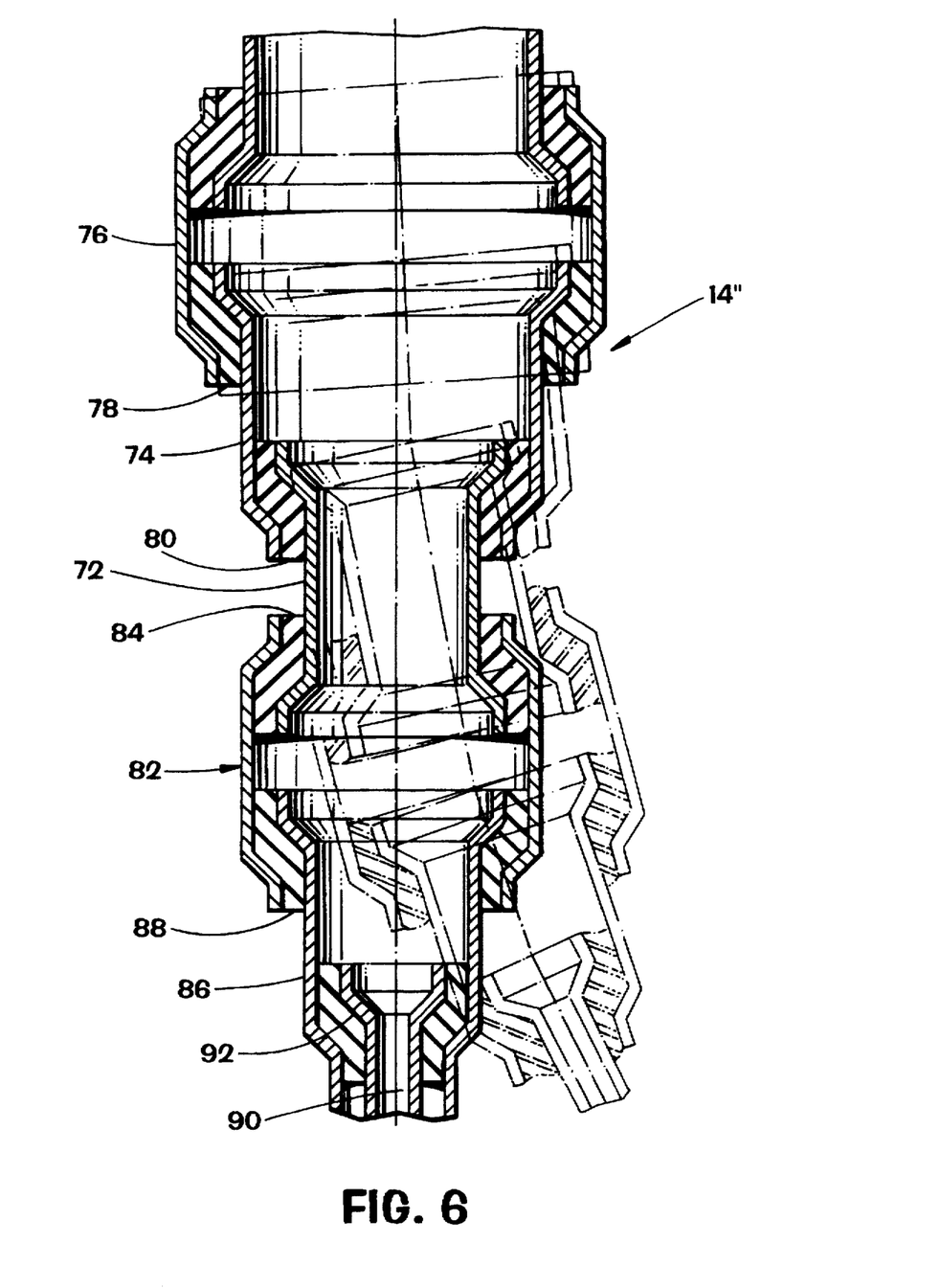
FIG. 6 is a cross-sectional view of still another embodiment of the present invention wherein a flexible joint is shown to include a combination of linked and nested shells in both a static and deflected condition.

Yet another embodiment of the flexible joint is shown in FIG. 6. In this embodiment, the flexible joint 14" combines the features of the embodiments shown in FIGS. 4 and 5. The flexible joint 14" includes a plurality of outer cylindrical housings and inner tubular members arranged in series and in a nested telescopic fashion.

The flexible joint 14" includes a nested inner tubular member 72 which is inserted into an inner tubular member 74. The inner tubular member 74 is, in turn, inserted into an outer cylindrical housing 76. An elastomeric pad 78 is bonded to an inner surface of the outer cylindrical housing 76 and an outer surface of the inner tubular member 74 in the region where the cylindrical outer housing 76 and the inner tubular member 74 overlap. A second elastomeric pad 80 is also provided which is bonded to an inner surface of the inner tubular member 74 and an outer surface of the nested inner tubular member 72 in the region where the inner tubular member 74 and the nested inner tubular member 72 overlap. The opposite end of the nested inner tubular member 72 is inserted into a second smaller outer cylindrical housing 82. A third elastomeric pad 84 is further provided which is bonded to an inner surface of the second outer cylindrical housing 82 and an outer surface of the nested inner tubular member 72 in the region where the second outer cylindrical housing and nested tubular member overlap.

A second smaller inner tubular member 86 is bonded to the opposite end of the second outer cylindrical housing 82 with an elastomeric pad 88. Finally, a reducer 90 for accommodating the umbilical 15 is disposed within the opposite end of the second inner tubular member 86. An elastomeric pad 92 is bonded to an inner surface of the second inner tubular member 86 and an outer surface of the reducer 90. As those of ordinary skill in the art will recognize, a number of inner tubular members and outer cylindrical housings may be provided. This embodiment illustrates one of the possible combinations of inner tubular members, outer cylindrical housings, and elastomeric pads which can be employed to meet a specific application.

The same basic method described above may be used in constructing the flexible joint 14" shown in FIG. 6. Alternatively, the flexible joint 14" can be constructed using the basic method when connecting opposite inner tubular members to an outer cylindrical housing and the modified method used in constructing the flexible joint 14' when nesting inner tubular members.

As will be appreciated by those of ordinary skill in the art, the flexible joint 14 according to the present invention, has many applications beyond those described here. Those applications are intended to be within the scope of this application as covered by the appended claims.

What is claimed is:

1. A flexible joint for facilitating bending of tubular segments, comprising:

an outer cylindrical housing having a first end, a portion of the first end having an inwardly projecting bevel-shape;

at least one inner tubular member having a first end, a portion of the first end of the at least one inner tubular member having an outwardly projecting bevel-shape, the first end of the at least one inner tubular member being disposed within the outer cylindrical housing; and an elastomeric pad disposed between and coupled to the outer cylindrical housing and the at least one inner tubular member at their respective first ends, the elastomeric pad having a bevel-shaped portion adjacent to the inwardly projecting bevel-shaped portion of the first end of the outer cylindrical housing and the outwardly projecting bevel-shaped portion of the first end of the at least one inner tubular member which retains the at least one inner tubular member within the outer cylindrical housing and permits limited axial, angular and rotational movement of the at least one inner tubular member relative to the outer cylindrical housing;

wherein the at least one inner tubular member has a second end, a portion of the second end having an inwardly projecting bevel-shape, the bevel-shaped portions of the first and second ends of the at least one inner tubular member being parallel to one another;

further comprising a nested inner tubular member having a first end, a portion of the first end of the nested inner tubular member having an outwardly projecting bevel-shape, the first end of the nested inner tubular member being disposed within the at least one tubular member;

further comprising a second elastomeric pad disposed between and coupled to the at least one inner tubular member and the nested inner tubular member at the second end of the at least one inner tubular member, the second elastomeric pad having a bevel-shaped portion adjacent to the inwardly projecting bevel-shaped portion of the second end of the at least one inner tubular member and the outwardly projecting bevel-shaped portion of the first end of the nested inner tubular member which retains the nested inner tubular member within the at least one inner tubular member and permits limited axial, angular and rotational movement of the nested inner tubular member relative to the at least one inner tubular member;

wherein the nested inner tubular member further comprises a second end having an outwardly projecting bevel-shaped portion; and further comprising a second outer cylindrical housing having a first end, a portion of the first end of the second outer cylindrical housing having an inwardly projecting bevel-shape, the second end of the nested inner tubular member being disposed within the second outer cylindrical housing, and a third elastomeric pad disposed between and coupled to the second outer cylindrical housing and the nested inner tubular member at the first end of the second outer cylindrical housing and the second end of the nested inner tubular member, the third elastomeric pad having a bevel-shaped portion adjacent to the inwardly projecting bevel-shaped portion of the first end of the second outer cylindrical housing and the outwardly projecting bevel-shaped portion of the second end of the nested inner tubular member which retains the nested inner tubular member within the second outer cylindrical housing and permits limited axial, angular and rotational movement of the nested inner tubular member relative to the second outer cylindrical housing.

2. A flexible joint for facilitating bending of tubular segments, comprising:

an outer cylindrical housing having a first end, a portion of the first end having an inwardly projecting bevel-shape;

at least one inner tubular member having a first end, a portion of the first end of the at least one inner tubular member having an outwardly projecting bevel-shape, the first end of the at least one inner tubular member being disposed within the outer cylindrical housing; and an elastomeric pad disposed between and coupled to the outer cylindrical housing and the at least one inner tubular member at their respective first ends, the elastomeric pad having a bevel-shaped portion adjacent to the inwardly projecting bevel-shaped portion of the first end of the outer cylindrical housing and the outwardly projecting bevel-shaped portion of the first end of the at least one inner tubular member which retains the at least one inner tubular member within the outer cylindrical housing and permits limited axial, angular and rotational movement of the at least one inner tubular member relative to the outer cylindrical housing, wherein an elongated tube is disposed within and coupled to the at least one inner tubular segment, and the elongated tube is also disposed within the outer cylindrical housing.

3. A flexible joint for facilitating bending of tubular segments, comprising:

an outer cylindrical housing having a generally straight inner section and an end portion, the inner section of the outer cylindrical housing having a first diameter, the end portion of the outer cylindrical housing having an inwardly projecting bevel-shape;

an inner tubular member having a first end portion, a second end portion, and a generally straight middle section joining said first end portion and said second end portion; the middle section of the inner tubular member having a second diameter less than said first diameter, the first end portion of the inner tubular member having an outwardly projecting bevel-shape, the second end portion of the inner tubular member having an inwardly projecting bevel shape, the first end portion of the inner tubular member being disposed within the outer cylindrical housing;

a first elastomeric pad disposed between and coupled to the outer cylindrical housing and the inner tubular member at the end portion of the outer cylindrical housing and the first end portion of the inner tubular member, the first elastomeric pad having a bevel-shaped portion adjacent to the inwardly projecting bevel-shape of the end portion of the outer cylindrical housing and the outwardly projecting bevel-shape of the first end portion of the inner tubular member which retains the inner tubular member within the outer cylindrical housing and permits limited axial, angular and rotational movement of the inner tubular member relative to the outer cylindrical housing;

a nested tubular member having a generally straight inner section and an end portion, the inner section of the nested tubular member having a third diameter less than said second diameter, the end portion of the nested tubular member having an outwardly-projecting bevel shape, the end portion of the nested tubular member being disposed within the inner tubular member; and a second elastomeric pad disposed between and coupled to the inner tubular member and the nested tubular member at the second end portion of the inner tubular member and the end portion of the nested tubular member, the second elastomeric pad having a bevel-shaped portion adjacent to the inwardly projecting bevel-shape of the second end portion of the inner tubular member and the outwardly projecting bevel-shape of the end portion of the nested tubular member which retains the nested tubular member within the inner tubular member and permits limited axial, angular and rotational movement of the nested tubular member relative to the inner tubular member.

4. The flexible joint as claimed in claim 3, wherein a portion of the nested tubular member is disposed within the outer cylindrical housing.

5. The flexible joint as claimed in claim 4, wherein a portion of the second elastomeric pad is disposed within the outer cylindrical housing.

6. The flexible joint as claimed in claim 3, further including an elongated tube coupled to the nested tubular member and extending within the inner tubular member and the cylindrical housing.

7. A flexible joint for facilitating bending of tubular segments, comprising:

an outer cylindrical housing having an end portion and a generally straight inner section, the inner section of the outer cylindrical housing having a first diameter, the end portion of the outer cylindrical housing having a generally straight outer section having a second diameter less than said first diameter, the end portion of the outer cylindrical housing also having a bevel-shaped section joining said outer section of the outer cylindrical housing to said inner section of the outer cylindrical housing;

an inner tubular member having an end portion and a generally straight inner section, the inner section of the inner tubular member having a third diameter less than said second diameter, the end portion of the inner tubular member having a generally straight outer section having a fourth diameter greater than said third diameter and less than said first diameter, the end portion of the inner tubular member also having a bevel-shaped section joining said outer section of the inner tubular member to said inner section of the inner tubular member, the end portion of the inner tubular member being disposed within the outer cylindrical housing so that a portion of the inner section of the inner tubular member is disposed within the outer section of the outer cylindrical housing and the outer section of the inner tubular member is disposed within the inner section of the outer cylindrical housing; and an inner elastomeric pad disposed between and coupled to the outer cylindrical housing and the inner tubular member at their respective end portions, the inner elastomeric pad having a bevel-shaped portion adjacent and coupled to the bevel-shaped section of the end portion of the outer cylindrical housing and the bevel-shaped section of the end portion of the inner tubular member, the inner elastomeric pad having a first generally straight portion adjacent and coupled to the outer section of the outer cylindrical housing and the inner section of the inner tubular member, and the inner elastomeric pad having a second generally straight portion adjacent and coupled to the inner section of the outer cylindrical housing and the outer section of the inner tubular member, wherein the inner elastomeric pad retains the inner tubular member within the outer cylindrical housing and permits limited axial, angular and rotational movement of the inner tubular member relative to the outer cylindrical housing.

8. The flexible joint as claimed in claim 7, further comprising:

a nested tubular member, the nested tubular member having an end portion, the end portion of the nested tubular member being disposed within the inner section of the inner tubular member; and a nested elastomeric pad disposed between and coupled to the inner section of the inner tubular member and the end portion of the nested tubular member, wherein the nested elastomeric pad retains the nested tubular member within the inner tubular member and permits limited axial, angular and rotational movement of the nested tubular member relative to the inner tubular member.

9. The flexible joint as claimed in claim 8, further including an elongated tube coupled to the nested tubular member and extending within the inner tubular member and the cylindrical housing.

10. The flexible joint as claimed in claim 8, wherein a portion of the nested tubular member is disposed within the outer cylindrical housing.

11. The flexible joint as claimed in claim 8, wherein a portion of the nested tubular member and at least a portion of the nested elastomeric pad are disposed within the outer section of the outer cylindrical housing.

12. The flexible joint as claimed in claim 7, further comprising:

a nested tubular member, the nested tubular member having an end portion disposed within the inner section of the inner tubular member; and a nested elastomeric pad disposed between and coupled to the inner section of the inner tubular member and the end portion of the nested tubular member;

wherein the end portion of the nested tubular member and at least a portion of the nested elastomeric pad are disposed within the outer section of the outer cylindrical housing; and wherein the nested elastomeric pad retains the nested tubular member within the inner tubular member and permits limited axial, angular and rotational movement of the nested tubular member relative to the inner tubular member.

13. A flexible joint for facilitating bending of tubular segments, comprising:

an outer cylindrical housing having an end portion and a generally straight inner section, the inner section of the outer cylindrical housing having a first diameter, the end portion of the outer cylindrical housing having a generally straight outer section having a second diameter less than said first diameter, the end portion of the outer cylindrical housing also having a bevel-shaped section joining said outer section of the outer cylindrical housing to said inner section of the outer cylindrical housing;

an inner tubular member having a first end portion and a generally straight middle section, the middle section of the inner tubular member having a third diameter less than said second diameter, the first end portion of the inner tubular member having a generally straight outer section having a fourth diameter greater than said third diameter and less than said first diameter, the first end portion of the inner tubular member also having a bevel-shaped section joining said outer section of the inner tubular member to said middle section of the inner tubular member, a portion of the middle section of the inner tubular member being disposed within the outer section of the outer cylindrical housing, the outer section of the inner tubular member being disposed within the inner section of the outer cylindrical housing;

an inner elastomeric pad disposed between and coupled to the outer cylindrical housing and the inner tubular member at the end portion of the outer cylindrical housing and the first end portion of the inner tubular member, the inner elastomeric pad having a bevel-shaped portion adjacent and coupled to the bevel-shaped section of the end portion of the outer cylindrical housing and the bevel-shaped section of the first end portion of the inner tubular member, the inner elastomeric pad having a first generally straight portion adjacent and coupled to the outer section of the outer cylindrical housing and the middle section of the inner tubular member, and the inner elastomeric pad having a second generally straight portion adjacent and coupled to the inner section of the outer cylindrical housing and the outer section of the inner tubular member, wherein the inner elastomeric pad retains the inner tubular member within the outer cylindrical housing and permits limited axial, angular and rotational movement of the inner tubular member relative to the outer cylindrical housing;

wherein the inner tubular member has a second end portion including a generally straight inner section, the inner section of the inner tubular member having a fifth diameter less than said third diameter, the second end portion of the inner tubular member also having a bevel-shaped section joining the inner section of the inner tubular member to the middle section of the inner tubular member; and further comprising:

a nested tubular member having an end portion and a generally straight inner section, the inner section of the nested tubular member having a sixth diameter less than said fifth diameter, the end portion of the inner tubular member having a generally straight outer section having a seventh diameter greater than said sixth diameter and less than said third diameter, the end portion of the nested tubular member also having a bevel-shaped section joining said outer section of the nested tubular member to said inner section of the nested tubular member, a portion of the inner section of the nested tubular member being disposed within the inner section of the inner tubular member, the outer section of the nested tubular member being disposed within the middle section of the inner tubular member; and a nested elastomeric pad disposed between and coupled to the inner tubular member and the nested tubular member at the second end portion of the inner tubular member and the end portion of the nested tubular member, the nested elastomeric pad having a bevel-shaped portion adjacent and coupled to the bevel-shaped section of the second end portion of the inner tubular member and the bevel-shaped section of the end portion of the nested tubular member, the nested elastomeric pad having a first generally straight portion adjacent and coupled to the inner section of the inner tubular member and the inner section of the nested tubular member, and the nested elastomeric pad having a second generally straight portion adjacent and coupled to the middle section of the inner tubular member and the outer section of the nested tubular member, wherein the nested elastomeric pad retains the nested tubular member within the inner tubular member and permits limited axial, angular and rotational movement of the nested tubular member relative to the inner tubular member.

14. The flexible joint as claimed in claim 13, wherein at least a portion of the second generally straight portion of the nested elastomeric pad and at least a portion of the outer section of the nested tubular member are disposed within the outer section of the outer cylindrical housing.

15. The flexible joint as claimed in claim 13, further including an elongated tube coupled to the nested tubular member and extending within the inner tubular member and the cylindrical housing.

16. A flexible joint for facilitating bending of tubular segments, comprising:

an outer cylindrical housing having a first end portion, a second end portion, and a generally straight inner section between said first end portion and said second end portion, the inner section of the outer cylindrical housing having a first diameter, each end portion of the outer cylindrical housing having a generally straight outer section having a second diameter less than said first diameter, each end portion of the outer cylindrical housing also having a bevel-shaped section joining said outer section of the outer cylindrical housing to the inner section of said each end portion of the outer cylindrical housing;

a first inner tubular member and a second inner tubular member, the first and second inner tubular members being longitudinally opposed and coupled by said outer cylindrical housing, each inner tubular member having an end portion and a generally straight inner section, the inner section of said each inner tubular member having a third diameter less than said second diameter, the end portion of said each inner tubular member having a generally straight outer section having a fourth diameter greater than said third diameter and less than said first diameter, the end portion of said each inner tubular member also having a bevel-shaped section joining said outer section of said each inner tubular member to said inner section of said each inner tubular member, a portion of the inner section of the first inner tubular member being disposed within the outer section of the first end portion of the outer cylindrical housing, the outer section of the first inner tubular member being disposed within the inner section of the outer cylindrical housing, a portion of the inner section of the second inner tubular member being disposed within the outer section of the second end portion of the outer cylindrical housing, the outer section of the second inner tubular member being disposed within the inner section of the outer cylindrical housing;

elastomer disposed between and coupled to the outer cylindrical housing and the first inner tubular member at the first end portion of the outer cylindrical housing and the end portion of the first inner tubular member, including a first bevel-shaped portion of elastomer adjacent and coupled to the bevel-shaped section of the first end portion of the outer cylindrical housing and the bevel-shaped section of the end portion of the first inner tubular member, a first generally straight portion of elastomer adjacent and coupled to the outer section of the first end portion of the outer cylindrical housing and the inner section of the first inner tubular member, and a second generally straight portion of elastomer adjacent and coupled to the inner section of the outer cylindrical housing and the outer section of the first inner tubular member, wherein the first bevel-shaped portion of elastomer, the first generally straight portion of elastomer, and the second generally straight portion of elastomer retain the first inner tubular member within the outer cylindrical housing and permit limited axial, angular and rotational movement of the first inner tubular member relative to the outer cylindrical housing; and elastomer disposed between and coupled to the outer cylindrical housing and the second inner tubular member at the second end portion of the outer cylindrical housing and the end portion of the second inner tubular member, including a second bevel-shaped portion of elastomer adjacent and coupled to the bevel-shaped section of the second end portion of the outer cylindrical housing and the bevel-shaped section of the end portion of the second inner tubular member, a third generally straight portion of elastomer adjacent and coupled to the outer section of the second end portion of the outer cylindrical housing and the inner section of the second inner tubular member, and a fourth generally straight portion of elastomer adjacent and coupled to the inner section of the outer cylindrical housing and the outer section of the second inner tubular member, wherein the second bevel-shaped portion of elastomer, the third generally straight portion of elastomer, and the fourth generally straight portion of elastomer retain the second inner tubular member within the outer cylindrical housing and permit limited axial, angular and rotational movement of the second inner tubular member relative to the outer cylindrical housing.

* * * * *